United States Patent
Brennan et al.

(10) Patent No.: US 10,760,531 B2
(45) Date of Patent: Sep. 1, 2020

(54) RESIN TRANSFER MOLDED ROCKET MOTOR NOZZLE

(71) Applicant: Raytheon Company, Waltham, MA (US)

(72) Inventors: Michael Brennan, McKinney, TX (US); Gray Fowler, Allen, TX (US)

(73) Assignee: Raytheon Company, Waltham, MA (US)

( * ) Notice: Subject to any disclaimer, the term of this patent is extended or adjusted under 35 U.S.C. 154(b) by 258 days.

(21) Appl. No.: 15/840,279

(22) Filed: Dec. 13, 2017

(65) Prior Publication Data

US 2019/0178207 A1    Jun. 13, 2019

(51) Int. Cl.
*F02K 9/97* (2006.01)
*F02K 9/40* (2006.01)

(52) U.S. Cl.
CPC .............. *F02K 9/974* (2013.01); *F02K 9/40* (2013.01); *F02K 9/97* (2013.01); *F02K 9/972* (2013.01); *F02K 9/978* (2013.01); *F05D 2220/80* (2013.01); *F05D 2230/30* (2013.01); *F05D 2250/283* (2013.01); *F05D 2260/231* (2013.01); *F05D 2300/133* (2013.01); *F05D 2300/17* (2013.01); *F05D 2300/224* (2013.01); *F05D 2300/226* (2013.01)

(58) Field of Classification Search
CPC ... F02K 9/40; F02K 9/97; F02K 9/972; F02K 9/974; F02K 9/978
See application file for complete search history.

(56) References Cited

U.S. PATENT DOCUMENTS

| 3,115,746 | A |   | 12/1963 | Hsia |
| 3,210,933 | A | * | 10/1965 | Crews ............... F02K 9/972 239/127.1 |
| 3,237,402 | A |   | 3/1966 | Steverding |
| 3,300,139 | A | * | 1/1967 | Feldman ............ F02K 9/972 239/127.3 |
| 3,354,651 | A |   | 11/1967 | Novotny |
| 3,354,652 | A |   | 11/1967 | Novotny et al. |
| 3,447,465 | A |   | 6/1969 | White |
| 3,776,466 | A |   | 12/1973 | Ray |

(Continued)

FOREIGN PATENT DOCUMENTS

FR    2376299    7/1978

OTHER PUBLICATIONS

Hofmann, Douglas, Compositionally graded metals: A new frontier of additive manufacturing, 2014, Materials Research Society (Year: 2014).*

(Continued)

*Primary Examiner* — Todd E Manahan
*Assistant Examiner* — Kyle Robert Thomas
(74) *Attorney, Agent, or Firm* — Renner, Otto, Boisselle & Sklar, LLP

(57) ABSTRACT

A rocket throat insert including an annular body having a radially inner annular wall portion and a radially outer annular portion. The inner wall portion has a contoured radially inner surface defining a nozzle throat. The outer portion includes an annular buttressing structure supporting the inner wall portion and defining one or more insulation gaps arranged annularly around the inner wall portion. The insulation gaps restrict the radial flow of heat through the annular body.

15 Claims, 3 Drawing Sheets

(56) References Cited

U.S. PATENT DOCUMENTS

| | | | |
|---|---|---|---|
| 4,022,129 A | 5/1977 | Day et al. | |
| 4,497,460 A | 2/1985 | Thorsted et al. | |
| 5,579,635 A | 12/1996 | Miskelly, Jr. et al. | |
| 5,779,151 A | 7/1998 | Sutton | |
| 5,894,723 A | 4/1999 | Gastal | |
| 6,324,833 B1 | 12/2001 | Singer et al. | |
| 6,389,801 B1 * | 5/2002 | Papenburg | F02K 9/97 239/127.1 |
| 6,548,794 B2 | 4/2003 | Facciano et al. | |
| 6,554,936 B1 | 4/2003 | Metcalf et al. | |
| 7,980,057 B2 | 7/2011 | Facciano et al. | |
| 2015/0204274 A1 | 7/2015 | Fowler | |
| 2016/0341151 A1 | 11/2016 | McPherson, Sr. | |

OTHER PUBLICATIONS

International Search Report and Written Opinion for corresponding International Application No. PCT/US2018/064165 dated Feb. 28, 2019.

* cited by examiner

RESIN TRANSFER MOLDED ROCKET MOTOR NOZZLE

FIELD OF THE INVENTION

The present invention is related to missiles and rocket motors. More specifically, the present invention relates to rocket motor nozzles.

DESCRIPTION OF THE RELATED ART

A rocket motor uses a convergent-divergent nozzle to accelerate hot combustion gases to produce thrust as described by Newton's third law of motion. The amount of thrust produced by the motor depends on the mass flow rate through the motor, the exit velocity of the flow, and the pressure at the exit of the motor.

The convergent-divergent nozzle has a throat region that is exposed to high temperature and pressure as compared to other zones of the nozzle. For this reason, rocket motor nozzles have employed a throat insert in the throat region. The throat insert needs to withstand the high temperature of the combustion gases while also providing erosion resistance. Materials heretofore considered for the throat insert include reinforced plastics, polycrystalline graphite, refractory metals and carbon/carbon composites. Typically, inserts formed from these materials are solid (free of voids aside from a central passage) and provide varying degrees of high temperature and erosion resistance, and varying degrees of thermal conductivity which may impact the performance of the insert and/or nozzle.

SUMMARY OF THE INVENTION

The present invention provides a rocket throat insert having low thermal conductivity. The low thermal conductivity can result in increased nozzle life by reducing defects and failures of other components of the nozzle and or rocket engine that are thermally connected to the throat insert. In particular, a rocket throat insert according to the invention is characterized by insulation gaps. The insert may have an inner wall portion that is supported by a buttressing structure that defines the insulation gaps.

Accordingly, a rocket throat insert comprises an annular body having a radially inner annular wall portion and a radially outer annular portion. The radially inner annular wall portion has a contoured radially inner surface defining a nozzle throat. The radially outer annular portion includes an annular buttressing structure supporting the radially inner annular wall portion and defining one or more insulation gaps arranged annularly around the radially inner wall portion for restricting the radial flow of heat through the annular body.

The annular buttressing structure may include an annular array of supports protruding radially outwardly from the inner annular wall portion.

The supports may be circumferentially and axially spaced apart to define therebetween the one or more insulation gaps, which may or may not be annularly continuous.

The radially outer portion may further include a radially outer wall portion, and the annular buttressing structure may be disposed radially between the radially outer and inner wall portions.

The annular buttressing structure may include an intermediate wall portion, a radially inner annular array of first supports extending radially between the radially inner and intermediate wall portions, and a radially outer annular array of second supports extending radially between the radially outer and intermediate wall portions.

The one or more insulation gaps may include one or more radially inner insulation gaps disposed between the radially inner and intermediate wall portions and one or more radially outer insulation gaps disposed between the radially outer and intermediate wall portions.

The radially inner insulation gaps may be fluidly isolated from the radially outer insulation gaps.

The one or more of the insulation gaps may be fluidly isolated from the environment surrounding the annular body.

The radially inner wall portion and the annular buttressing structure may be unitary.

The supports may be in the form of spokes radiating from a central axis of the annular body.

At a circumferential cross-section of the buttressing structure, the collective cross-sectional area of the one or more insulation gaps may be at least twice the collective cross-sectional area of the spokes.

The buttressing structure may be in the form of a honeycomb having walls surrounding cells that form the insulation gaps, and the walls of the honeycomb may extend radially.

The annular body may be made of a refractory material.

The annular buttressing structures is sufficient to prevent radially outward deflection of the contoured radially inner surface at a longitudinal midpoint of the annular body by no more than that predetermined about when a pressure, such as a pressure of 2000 psi is applied to the contoured radially inner surface.

According to another aspect of the invention, a rocket motor nozzle comprises a dome having a nozzle throat region, and the aforesaid throat insert installed in the dome at the nozzle throat region with the contoured radially inner surface forming a part of a throat for passage therethrough of combustion gases.

According to another aspect of the invention, a method is provided for manufacturing rocket motor nozzles. The method enables cost savings and/or lower defects when compared to the standard prepreg processes, and enables the formation of a nozzle throat insert having internal insulation gaps. To these ends, additive manufacturing is used to form the nozzle throat insert.

The foregoing and other features of the invention are hereinafter described in greater detail with reference to the accompanying drawings.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
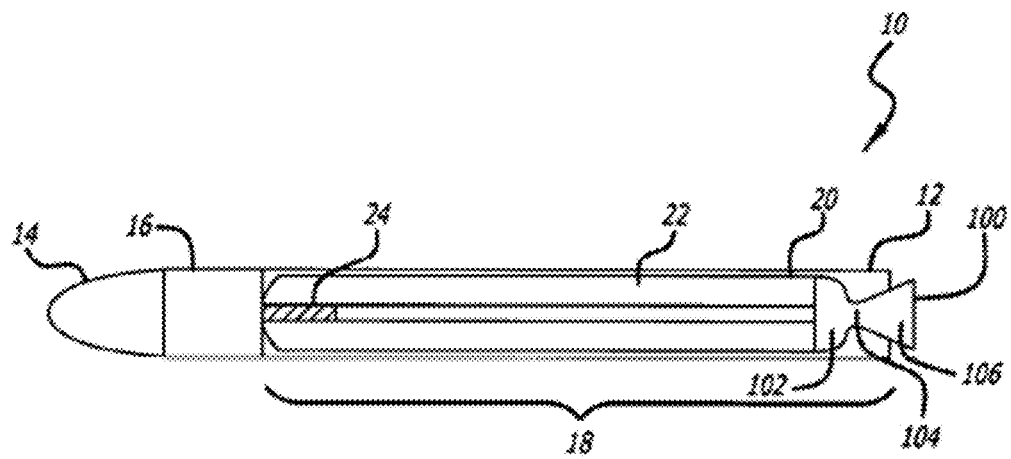
FIG. 1 is a simplified schematic of an illustrative missile with a rocket motor nozzle in accordance with an illustrative embodiment of the present invention.

FIG. 1 is a simplified schematic of an illustrative missile 10 with a rocket motor nozzle 100 designed in accordance with an illustrative embodiment of the present invention. The illustrative missile 10 includes a missile body 12, which houses a sensor 14 for locating a target, a guidance system 16 for guiding the missile 10 toward the target, and a rocket motor 18 for providing thrust to increase the range of the missile 10. The rocket motor 18 includes a combustion chamber 20 filled with a propellant 22 that is ignited by an igniter 24 controlled by the guidance system 16.

Figure 2:
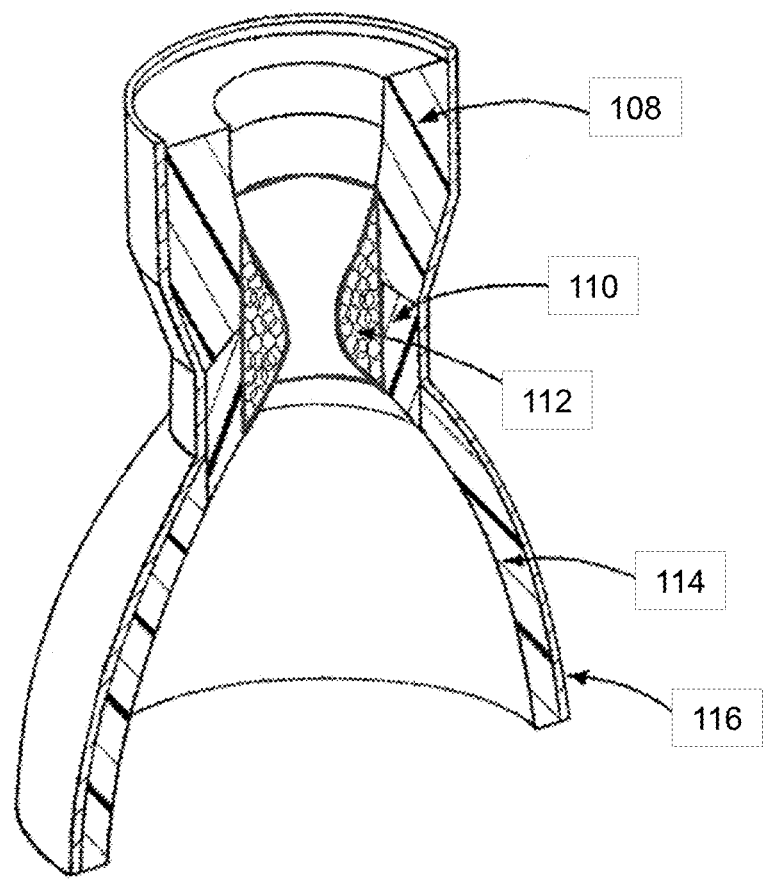
FIG. 2 is a perspective view, partly broken away in section, of a nozzle structure that includes an exemplary rocket throat insert in accordance with an illustrative embodiment of the present invention.

The rocket motor 18 also includes a rocket motor nozzle 100 having a novel integrated dome and nozzle structure. The rocket motor nozzle 100 may include the dome 102 and a rocket throat insert 112 (FIG. 2). The rocket throat insert 112 may be installed in the dome 102 at the nozzle throat region with the contoured radially inner surface 128 forming a part of a throat for passage therethrough of combustion gases. That is, the dome 102 portion of the dome/nozzle structure forces the exhaust gas produced by the combustion of the propellant 22 to exit the combustion chamber 20 through a narrow throat 104 and out the nozzle 106, which is shaped such that it causes the gas to accelerate and expand, thereby providing thrust for the missile 10. The dome 102 and nozzle structure 100 may be integrally manufactured with a single high temperature resin system. In alternative embodiments, the dome 102 and nozzle assemblies 100 may be separate structures.

Referring to FIG. 2, the rocket motor nozzle 100 includes nozzle composite region 108, throat composite region 110, throat insert 112 and dome composite region 114 within metal housing 116. The metal housing 116 may be constructed of titanium, steel, aluminum, or any other suitable rigid housing material. The rigid housing can be incorporated into the molding process of the rocket nozzle.

The nozzle composite region 108, located at the entrance of the rocket motor nozzle 100, may be constructed of a thermally insulative fabric placed at specific angles, commonly referred to as "shingling". Throat composite region 110 may include a fiber reinforcement having higher temperature capability, such as PAN-based carbon fiber (polyacrylonitrile). Additional details regarding construction of the nozzle composite region 108 and throat composite region 110 are provided in U.S. Ser. No. 14/313,017 (filed Jun. 24, 2014), which is incorporated herein by reference in its entirety.

Figure 3:
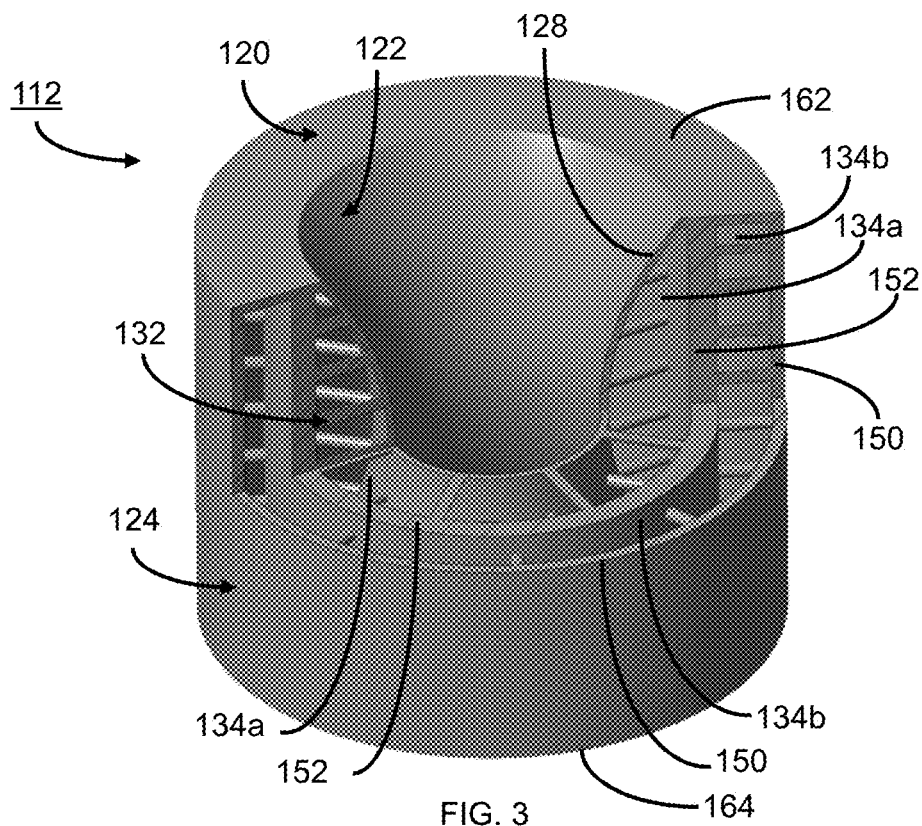
FIGS. 3 and 4 are perspective views, partly broken away in section, of the rocket throat insert in accordance with an illustrative embodiment of the present invention.
Figure 4:
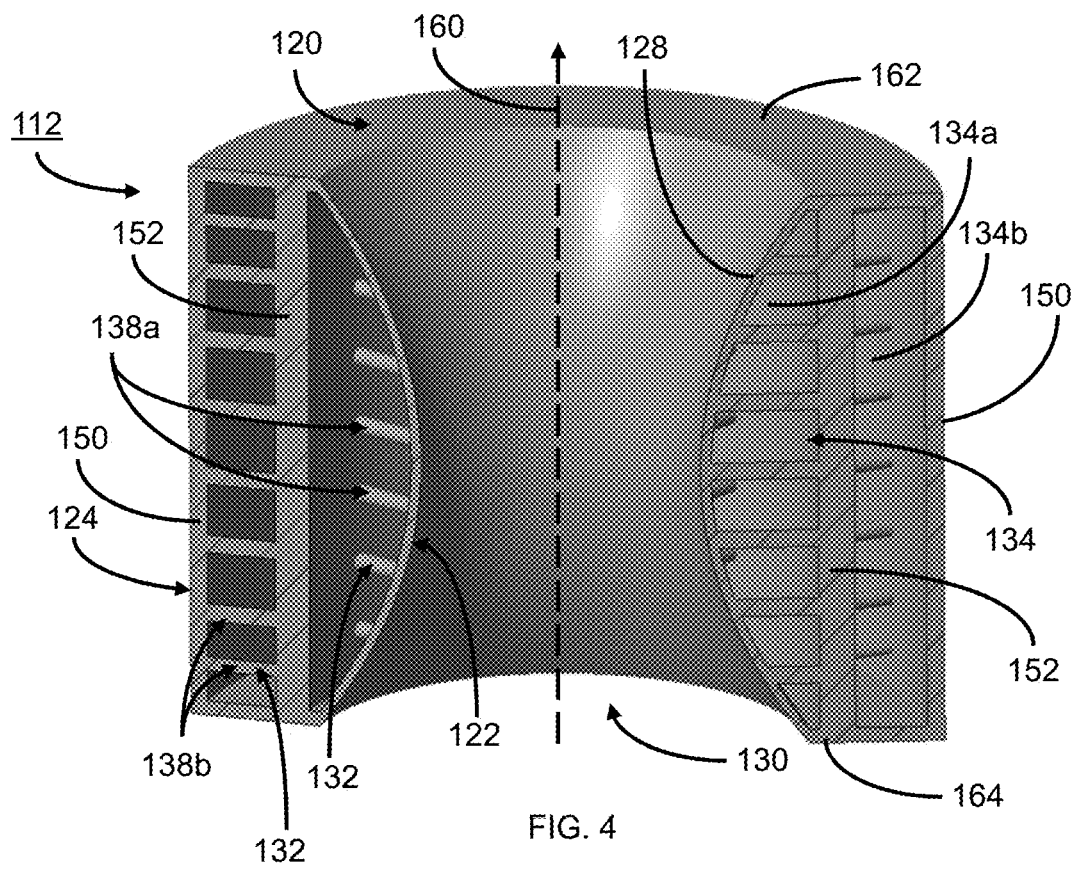

With reference now in addition to FIGS. 3 and 4, the rocket throat insert 112 includes an annular body 120 having a radially inner annular wall portion 122 and a radially outer annular portion 124. The inner wall portion 122 has a contoured radially inner surface 128 defining a nozzle throat 130. The outer portion 124 includes an annular buttressing structure 132 supporting the inner wall portion 122 and defining one or more insulation gaps 134 arranged annularly around the inner wall portion 122. The insulation gaps 134 restrict the radial flow of heat through the annular body 120.

The buttressing structure 132 may comprise an annular array of supports 138 protruding radially outwardly from the inner wall 122. The supports 138 may be circumferentially and axially spaced apart to define therebetween the insulation gap(s) 134.

In the embodiment shown in FIGS. 3 and 4, the array of supports 138 are in the form of spokes radiating from a central axis 160 of the annular body 120. The cross section of each spoke may have any suitable shape (e.g., circular, hexagonal, square, etc.). At a circumferential cross-section of the buttressing structure 132, the collective cross-sectional area of the insulation gap(s) 134 may be at least twice the collective cross-sectional area of the spokes. For example, the collective cross-sectional area of the insulation gap(s) 134 may be at least ten times the collective cross-sectional area of the spokes.

Figure 5:
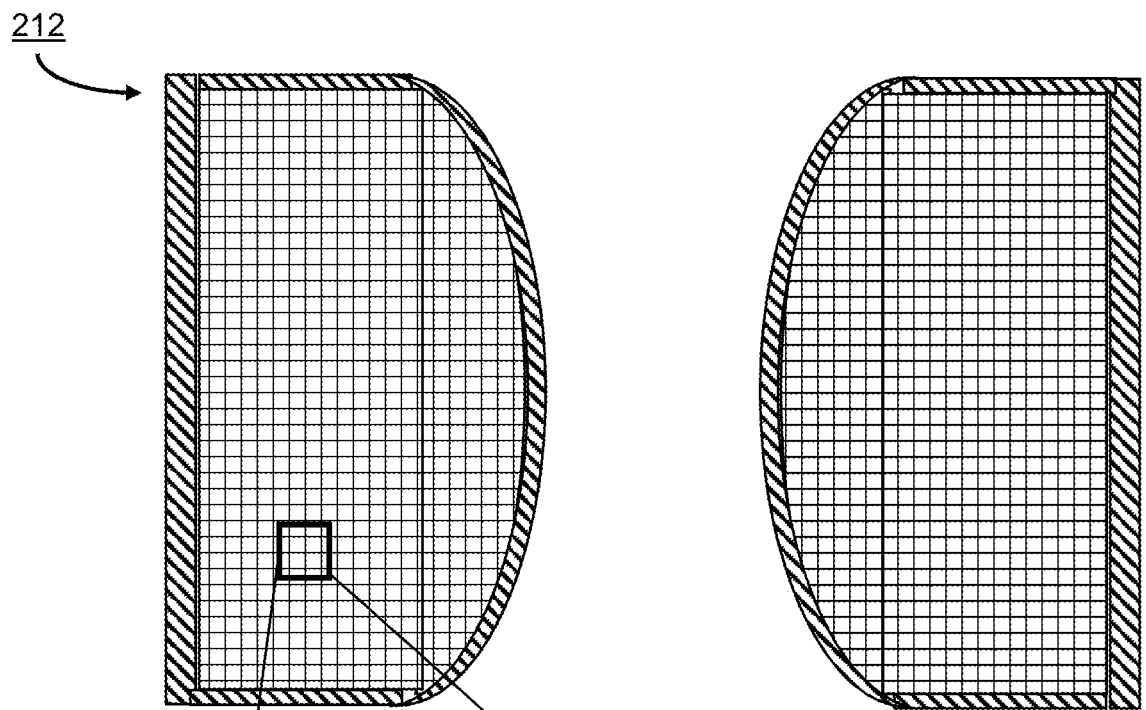
FIGS. 5 and 6 are cross sectional views of another exemplary throat insert in accordance with another illustrative embodiment of the present invention.
Figure 6:
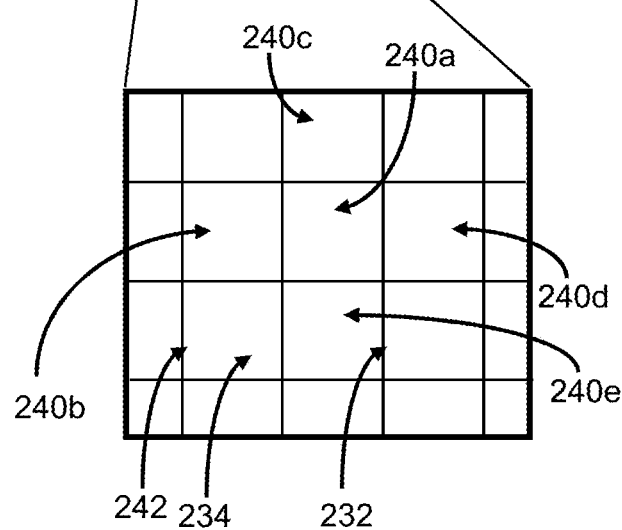

In the embodiment shown in FIGS. 5 and 6, the supports 238 of the rocket throat insert 212 include a plurality of cells 240. Each cell 240 includes a cell wall 242 and a portion of the cell wall 242 of a given cell is shared with the cell wall 242 of an adjacent cell 240. For example, FIG. 6 shows that each cell 240a shares its four cell walls with the four neighboring cells 240b-240e.

As will be understood by one of ordinary skill in the art, the overall shape of each cell 240 (formed by the cell walls 242) may be hexagonal, square (FIGS. 5 and 6), circular, triangular, or have any suitable shape. For example, the buttressing structure 232 may be in the form of a honeycomb having walls 242 surrounding cells 240 that form the insulation gaps 234. The walls 242 of the honeycomb may extend radially. The cells are not limited to being a single size or shape. For example, the cells 240 may vary in shape and size randomly or according to a predetermined pattern. As an example, the cells 240 may have a foam like structure (i.e., a sponge like appearance with a plurality of open areas formed by the insulation gaps 234).

The rocket throat insert 112 may not include an outer wall. That is, the outer wall may be formed by a structure into which the rocket throat insert 112 is installed. Alternatively, the radially outer portion 124 may include a radially outer wall portion 150. The annular buttressing structure 132 may be disposed radially between the radially outer portion 124 (e.g., the outer wall portion 150) and the inner wall portion 122. The radially outer wall portion 150 may include an exterior surface arranged opposite the inner surface 128.

In the embodiment shown in FIGS. 3 and 4, the annular buttressing structure 132 includes an intermediate wall portion 152. A radially inner annular array of first supports 138a extends radially between the radially inner 122 and intermediate wall portions 152 and a radially outer annular array of second supports 138b extends radially between the radially outer 124 and intermediate wall portions 152. The intermediate wall portion 152 may be arranged parallel to the radially outer wall portion 150. Alternatively, the intermediate wall portion 152 may intersect with the radially outer wall portion 150.

With continued reference to FIGS. 3 and 4, the insulation gap(s) 134 may include one or more radially inner insulation gaps 134a disposed between the radially inner 122 and intermediate wall portions 152 and one or more radially outer insulation gaps 134b disposed between the radially outer 150 and intermediate wall portions 152. The radially inner insulation gaps 134a may be fluidly isolated from the radially outer insulation gaps 134b. For example, gas contained within the inner insulation gaps 134a may be prevented from mixing with gas contained within the outer insulation gaps 134b. Similarly, the insulation gaps 134 may be fluidly isolated from the environment surrounding the annular body 120 (e.g., by the outer wall portion 150). For example, the insulation gaps 134 may be isolated from the external environment such that gas contained within the insulation gaps 134 is prevented from leaving the annular body 120 and external gases are prevented from entering the insulation gaps 134.

The inner wall portion 122 and the buttressing structure 132 may be unitary. For example, the inner wall portion 122 and the buttressing structure 132 may be 3D printed from the same material.

The buttressing structure 132 may include a plurality of inner support elements 138a and a plurality of outer support elements 138b. The inner support elements 138a may project radially, with respect to a central longitudinal axis 160 of the rocket throat insert 112, between the radially inner wall portion 122 and the intermediate wall portion 152. The outer support elements 138b may project radially, with respect to the central longitudinal axis 160, between the radially outer 150 and intermediate wall portions 152.

The rocket throat insert 112 may also include a first joining surface 162 and a second joining surface 164. The first joining surface 162 may be arranged opposite to the second joining surface 164. The first joining surface 162 and the second joining surface 134 may extend between the inner wall portion 122 and outer wall portion 150.

The annular body may be made of a refractory material (e.g., metal, carbon-carbon coated with metal, high temperature ceramic, etc.). The refractory material may comprise at least one of Carbon-Carbon, Hafnium Carbide, Titanium, Inconel alloys, or Tantalum Carbide.

The insulation gaps 134 may be annularly continuous as shown in FIGS. 3 and 4. The insulation gaps 134 may also be filled with a gas (e.g., air, an inert gas, etc.) or an insulating material. As described previously, the contents of the insulation gaps 134 may be prevented from leaving the annular body 120 by the inner wall portion 122 and the outer wall portion 150.

The annular buttressing structures 132 may be sufficient to prevent radially outward deflection of the contoured radially inner surface 128 at a longitudinal midpoint of the annular body 120 by no more than a predetermined amount when a pressure of 2000 psi is applied to the contoured radially inner surface.

A volumetric ratio between the buttressing structure 132 and the insulation gaps 134 may be less than 5%, less than 10%, or less than 20%. That is, the majority of the space located between the inner surface 128 and an outer boundary of the outer portion 124 (e.g., the outer wall portion 150) may be insulation gaps 134. The volumetric ratio between the buttressing structure 132 and the insulation gaps 134 may be chosen such that applying a given pressure to the inner surface 128 does not deform a shape of the inner surface 128, or only deforms the shape by a limited amount. For example, the volumetric ratio may be chosen to be the smallest number that prevents deformation and/or failure of the shape of the inner surface 128 when the given pressure (e.g., 6000 PSI) is applied to the inner surface 128. The particular volumetric ratio between the buttressing structure 132 and the insulation gap 134 may depend on the materials used to construct the rocket throat insert 112 and the shape and arrangement of the inner surface 128 and the buttressing structure 132.

Constructing the rocket throat insert 112 to include insulation gaps 134 allows for reduced cost, weight, and heat transference (e.g., particularly useful in high heat applications greater than 2000° C.). Construction of the rocket throat insert 112 may be performed using resin transfer molding or (in a preferred embodiment) additive construction. For example, additive manufacturing may be used to form the annular body 120 as a unitary structure. Additive construction refers to techniques such as 3D printing. Additive manufacture may be performed using refractory alloys such as Hafnium Carbide (HfC), Titanium (Ti), Inconel alloys, and/or Tantalum Carbide (TaC). Additive manufacturing may be performed using any refractory alloy having a high melting point (e.g., greater than 3900° C.).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rocket throat insert comprising:
an annular body having a radially inner annular wall portion and a radially outer annular portion;
wherein the radially inner annular wall portion has a contoured radially inner surface defining a rocket nozzle throat;
wherein the radially outer annular portion includes an annular buttressing structure supporting the radially inner annular wall portion and defining one or more insulation gaps arranged annularly around the radially inner wall portion for restricting the radial flow of heat through the annular body;
wherein the radially outer wall portion further includes a radially outer wall portion, and the annular buttressing structure is disposed radially between the radially outer and inner wall portions;
wherein the annular buttressing structure includes an intermediate wall portion, a radially inner annular array of first supports extending radially between the radially inner and intermediate wall portions, and a radially outer annular array of second supports extending radially between the radially outer and intermediate wall portions;
wherein the first supports and second supports are both in the form of spokes radiating away from a central axis of the annular body; and
wherein the spokes each have a length in the radial direction greater than a width.

2. The rocket throat insert of claim 1, wherein the supports are circumferentially and axially spaced apart to define therebetween the one or more insulation gaps.

3. The rocket throat insert of claim 2, wherein one or more of the insulation gaps are annularly continuous.

4. The rocket throat insert of claim 1, wherein the one or more insulation gaps include one or more radially inner insulation gaps disposed between the radially inner and intermediate wall portions and one or more radially outer insulation gaps disposed between the radially outer and intermediate wall portions.

5. The rocket throat insert of claim 4, wherein the radially inner insulation gaps are fluidly isolated from the radially outer insulation gaps.

6. The rocket throat insert of claim 1, wherein the one or more of the insulation gaps are fluidly isolated from the environment surrounding the annular body.

7. The rocket throat insert of claim 1, wherein the radially inner wall portion and the annular buttressing structure are unitary.

8. The rocket throat insert of claim 1, wherein at a circumferential cross-section of the buttressing structure, the collective cross-sectional area of the one or more insulation gaps is at least twice the collective cross-sectional area of the spokes.

9. The rocket throat insert of claim 1, wherein the annular body is made of a refractory material.

10. The rocket throat insert of claim 1, wherein the annular buttressing structures is sufficient to prevent radially outward deflection of the contoured radially inner surface at a longitudinal midpoint of the annular body by no more than a predetermined amount when an operating pressure.

11. A rocket motor nozzle comprising:
a dome having a nozzle throat region;
the rocket throat insert of claim 1 installed in the dome at the nozzle throat region with the contoured radially inner surface forming a part of a throat for passage therethrough of combustion gases.

12. A method of producing the rocket throat insert of claim 1, comprising using additive manufacturing to form the annular body as a unitary structure.

13. The rocket throat insert of claim 1, wherein at a circumferential cross-section of the buttressing structure a collective cross-sectional area of the one or more insulation gaps is at least twice a collective cross-sectional area of the first supports and the second supports.

14. The rocket throat insert of claim 1, wherein at a circumferential cross-section of the buttressing structure a collective cross-sectional area of the one or more insulation gaps is at least ten times a collective cross-sectional area of the first supports and the second supports.

15. The rocket throat insert of claim 1, wherein the intermediate wall portion is parallel to the radially outer wall portion.

* * * * *